(12) United States Patent
Nguyen et al.

(10) Patent No.: US 7,370,220 B1
(45) Date of Patent: May 6, 2008

(54) METHOD AND APPARATUS FOR CONTROLLING POWER SEQUENCING OF A PLURALITY OF ELECTRICAL/ELECTRONIC DEVICES

(75) Inventors: Thai Nguyen, Thornton, CO (US); Charles A. Milligan, Golden, CO (US); Jacques Debiez, Cugnaux (FR)

(73) Assignee: Storage Technology Corporation, Louisville, CO (US)

( * ) Notice: Subject to any disclaimer, the term of this patent is extended or adjusted under 35 U.S.C. 154(b) by 474 days.

(21) Appl. No.: 10/745,744

(22) Filed: Dec. 26, 2003
(Under 37 CFR 1.47)

(51) Int. Cl.
*G06F 1/00* (2006.01)
(52) U.S. Cl. ...................... 713/330; 713/300
(58) Field of Classification Search ............ 713/1, 713/2, 330, 300
See application file for complete search history.

(56) References Cited

U.S. PATENT DOCUMENTS

| | | | |
|---|---|---|---|
| 4,233,666 A * | 11/1980 | Walberg et al. ............ 365/226 |
| 5,922,062 A * | 7/1999 | Evoy ........................ 710/305 |
| 6,212,645 B1 | 4/2001 | Tjandrasuwita ............. 713/330 |
| 6,233,625 B1 * | 5/2001 | Vander Kamp et al. ...... 710/10 |
| 6,233,693 B1 | 5/2001 | Berglund et al. ........... 713/340 |
| 6,237,103 B1 | 5/2001 | Lam et al. .................. 713/330 |
| 6,408,394 B1 * | 6/2002 | Vander Kamp et al. .... 713/300 |
| 6,965,956 B1 * | 11/2005 | Herz et al. .................... 710/74 |
| 6,966,006 B2 * | 11/2005 | Pacheco et al. ............. 713/300 |

OTHER PUBLICATIONS

Deitel et al., C++ How to Program, 1998, Prentice Hall; Second Ed., pp. 224-227.*

\* cited by examiner

*Primary Examiner*—Mark Connolly
(74) *Attorney, Agent, or Firm*—Brooks Kushman P.C.

(57) ABSTRACT

A method and apparatus for managing power sequencing in a data storage system. The turn-on or spin-up sequence for the media drives in an array of media drives is selectively controlled such that the overall rush current is reduced. The individual drive components are characterized to determine a power profile for each such component. A closed-loop process is then used to manage and reduce peak power requirements when starting up or spinning up an array of media drives using the drive profiles. The media drives can also be organized as a plurality of sets of drives, and a power profile for each set of drives is used to manage and reduce peak power requirements.

18 Claims, 5 Drawing Sheets

METHOD AND APPARATUS FOR CONTROLLING POWER SEQUENCING OF A PLURALITY OF ELECTRICAL/ELECTRONIC DEVICES

BACKGROUND OF THE INVENTION

1. Field of the Invention

The present invention is directed to a method and apparatus for improving power control in electrical/electronic devices, and more particularly, a method and apparatus for controlling power sequencing for a plurality of electrical/electronic devices such as media drives.

2. Background of the Invention

As electrical/electronic devices become more ubiquitous in today's society, power usage by such devices is becoming a key issue. For any given device, power usage is proportional to heat dissipation and it is thus desirable to reduce power requirements of a device in order to reduce the resultant heat and its associated problems with dissipation of such heat using heat sinks and the like. In addition, the shear number of electrical/electronic devices creates demand on the utility industry to build power plants that provide enough energy to meet peak demands for electrical energy. In similar fashion, when designing power supplies for electrical/electronic systems having many types of components, the power supply for such a system must be designed to meet the maximum, or peak, demand that it will 'see' during system operation. Generally speaking, as peak demands get higher, a power subsystem having a higher electrical energy output capability is required to meet such demand, thereby increasing size and cost of such power subsystem.

One type of electrical/electronic subsystem having a plurality of components is a disk array, having a plurality of disk drives, and used to provide data storage to a computer system. A RAID disk array is one such array, having a plurality of physical disk drives logically configured together to present a redundant storage subsystem to a computer. A newer type of disk array now coming to market is known as an ATA disk array, which is composed of a plurality of ATA disk drives. In the past, ATA disks have only been used in lower end computers such as personal computers and lacked the performance and reliability needed at the data center level. But advancements in quality and speeds have more recently made them appealing to vendors seeking a lower price point. A plurality of these relatively low performance drives are now being packaged together to create an ATA disk array having a relatively high performance, and to provide RAID storage subsystems.

In general, disk drives draw a proportionately large amount of current during start-up, as the individual disk platters must be brought from a quiescent power-down state to a run time state where the disk(s) are spinning at their nominal spin rate. Servo motors are typically used to spin the disk drives, and it is these motors that draw the current required to transform the disk(s) from a non-spinning state to a spinning state. The inertia required to go from a non-spinning state to a spinning state is what causes the high surge current or rush-in current at start-up. Once spinning, not as much current is required to maintain a disk in a spinning state. When a large number of disk drives are simultaneously going through their power up sequences and turning-on the motors to spin up the disks, the overall current required to meet this turn-on surge current is the sum of the surge currents of each individual drive.

Certain designs stagger the time when individual disk drives spin-up to thereby provide a smoothing in the overall peak power requirements of the power supply used to power the media drives. However, these types of systems typically use a worst case drive and its associated worst case characteristics when determining the staggered times for spinning up the drives. This can needlessly delay the time from when a system is first powered up to when the all the drives in the system are ready. Excessive delays before the drives are all ready slow system availability at start-up, and in some instances can actually cause certain operating systems to fail their boot-up sequence or otherwise generate system errors because of the excessive delay.

It is thus a problem with disk array systems that either large and expensive power supplies are required to meet this start-up surge current requirement, or excessive start-up delays are introduced when bringing a disk array on-line during power-up. There is a need to develop a method and apparatus that mitigates this high surge current requirement. The present invention is designed to overcome the aforementioned problems.

SUMMARY OF THE INVENTION

A method and apparatus for managing power sequencing in a data storage system. The turn-on or spin-up sequence for media drives in an array of media drives is selectively controlled such that the overall rush current is reduced. The individual drive components are characterized to determine a power profile for each such component. A closed-loop process is then used to manage and reduce peak power requirements when starting up or spinning up an array of media drives using the drive profiles. The media drives can also be organized as a plurality of sets of drives, and a power profile for each set of drives is used to manage and reduce peak power requirements.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 is a representative current profile for a media drive such as one of media drives D1-D5 shown in FIG. 1a.

DETAILED DESCRIPTION OF THE PREFERRED EMBODIMENT

Figure 1A:
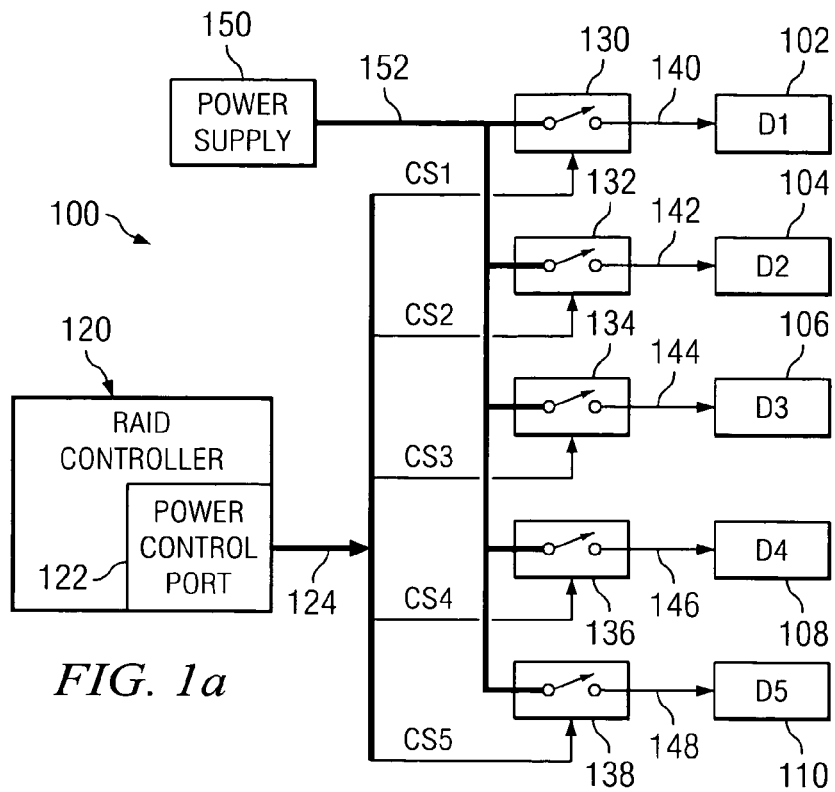
FIG. 1a is a system level block diagram of the enablement sequencing for a plurality of media drives in a data storage system.

The present invention is directed to a method and system for managing the power-up, turn-on or spin-up of media drives in an array of media drives. Turning now to FIG. 1*a*, there is shown a high-level block diagram of the preferred embodiment of the present invention at 100. A plurality of media drives D1-D5 is shown at 102, 104, 106, 108 and 110. While in the preferred embodiment, the media drives are disk drives configured in a RAID array, other types of media drives configured in other types of arrays are certainly possible within the contemplated scope of the present invention. For example, tape drives or optical media drives such as magneto optical, CD or DVD could similarly be used in lieu of, or in addition to, the disk drives D1-D5 that are shown in FIG. 1*a*. In addition, certain innovations in solid state storage and nanotechnology storage also provide devices that have power profiles that have multiple levels depending on functions executed. We will discuss the principles of this invention in terms of spinning up and down disk drives, but the principles also apply to the management of power in a wide variety of device types and mixtures of technologies. In order to operate disk drives D1-D5 as a RAID array, a RAID controller 120 is provided. The details of RAID controllers are well known in the art, and do not need to be further described herein. However, this particular RAID controller has an additional feature not commonly a part of the RAID controller. Power control port 122 is included in the preferred embodiment as part of the RAID controller, but could alternatively exist elsewhere within the overall system so long as the functions that will be further described below are provided by such control port. In the preferred embodiment, power control port 122 controls signals on power control bus 124, including power control signals CS1, CS2, CS3, CS4 and CS5. Power control signals CS1-CS5 are operatively coupled to a control input of power relays (or electronic power switches) 130, 132, 134, 136 and 138, respectively. These power control signals are used to selectively enable power relays 130, 132, 134, 136 and 138 in order to selectively provide power from power supply 150, via power bus 152, to each of the individual disk drives D1-D5 which are each coupled to a respective output at 140, 142, 144, 146 and 148. Power control unit 122 is used to sequence or selectively enable the powering or spin-up of the individual disk drives by use of power control signals which enable/disable power to the drives using the relays (or electronic power switches), as will be further described in detail below. Alternatively, control signals CS1-CS5 could be used to enable spinning down drives that are already powered up. In such an alternate embodiment, power relays 130-138 would not be needed, and the drives would be directly coupled to a power source. Control signals CS1-CS5 would then be coupled to an appropriate input control signal of drives D1-D5 such as the reset inputs to selectively control spin-up and spin-down of the drives.

Figure 2:
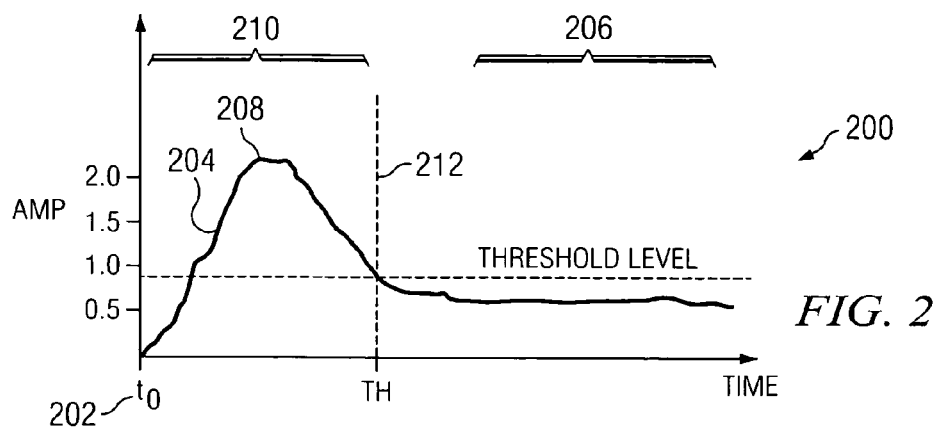

Turning now to FIG. 2, there is shown a representative current profile for a media storage device at 200. This graph shows current (in Amperes) drawn by the device (Y-axis) as a function of time (X-axis). The device is either turned on or spin-enabled at time $t_o$. Spin-enabled is a state whereby the device is already powered-up, but is not spinning due to being placed in a spin-down mode. This spin-down mode may be the result of the device being temporarily disabled in order to reduce power consumption when the device is not currently being used but still has power applied to it. Returning to FIG. 2, at time $t_o$ shown at 202 the spindle motor begins to spin the device media, and the current being drawn by the device increases rapidly, as shown at 204. Once the device has achieved its quiescent spin speed (such speed varying by device, but may be at speeds such as 7,200 RPM, 7,500 RPM, 10,000 RPM, and 15,000 RPM) the current consumed by the device drops to a substantially constant value as shown at 206 of FIG. 2. The peak current 208 that is drawn during spin-up can be 2-4 times this subsequent substantially constant or steady state value at 206. The present invention determines and uses these current profiles as part of its power management technique.

The current profile shown in FIG. 2 is a representative profile for the current drawn by a media drive during spin-up, and shows the rush-in current that initially occurs as a result of having to overcome the inertia of a disk that is not spinning. Each media drive will have a current profile. However, the specific current profile for a given drive will typically vary somewhat from the current profiles of other drives. In addition, the current profile may have more than two levels of operation. Profiles with three or more levels will allow the scheduling system to invoke a richer set of algorithms to manage the overall power profile. The following description is in the context of a two level device profile but one skilled in the art can readily see how to extend the logic to decide among a plurality of levels. The variation among devices in any profile is due to differences in the actual components used to manufacture the drive, such as component tolerances. The profiles can also change over time due to component aging and an associated change in the component's characteristics. While each media drive will typically have a different profile, the media drives will still typically exhibit the initial peak current surge during initially device spin-up as shown at 210 in FIG. 2. By determining the current profile for each drive in a system, it is possible to customize the timing of when to spin-up media drives in order to optimize the trade-off between peak power consumption vs. time to achieve an array-ready state as discussed above.

Figure 1B:
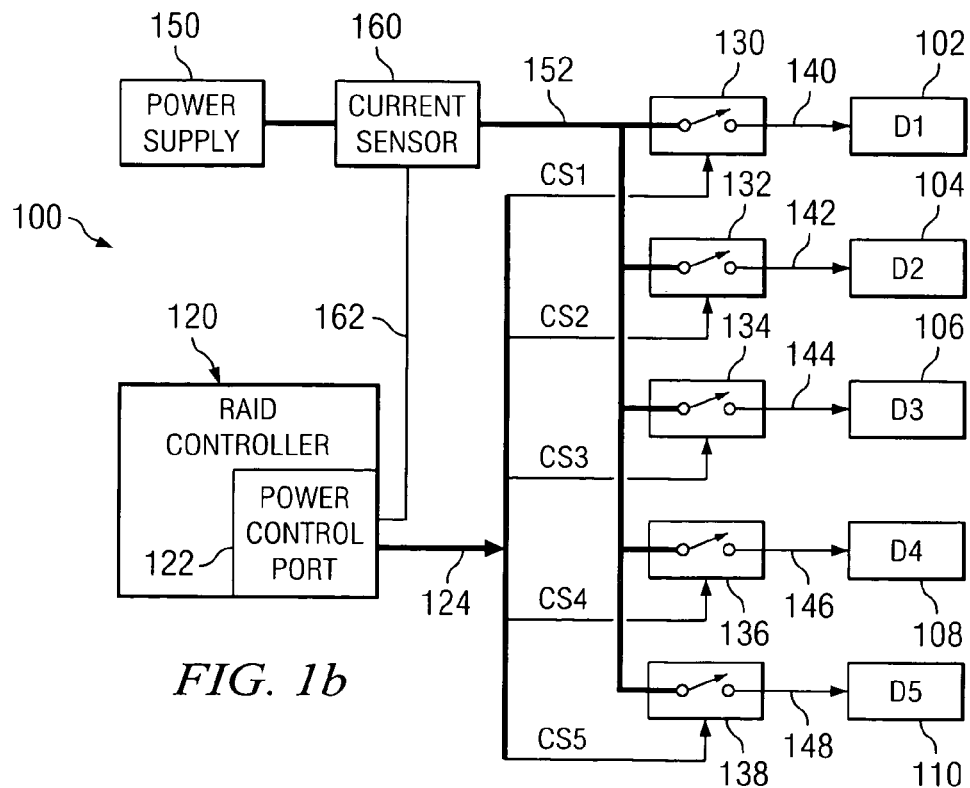
FIG. 1b is a system level block diagram of the enablement sequencing for a plurality of media drives in a data storage system, including online support for current profiling of devices.
Figure 3:
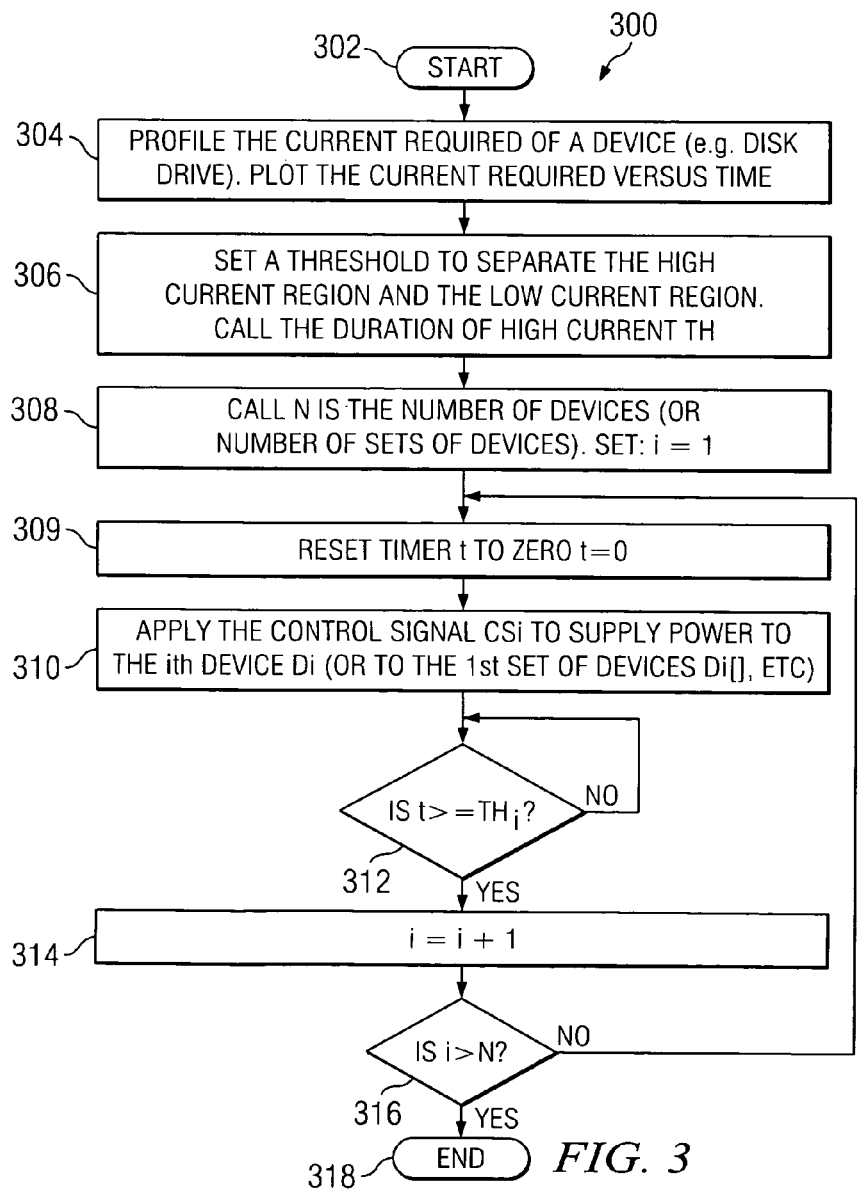
FIG. 3 is a flow chart showing the process flow for selectively enabling power or spin-up of media drives in a data storage system.

The flow-chart shown at 300 in FIG. 3 shows the control flow used to manage the power control of a data storage system of the present invention. The process starts at 302, and proceeds to 304 where the current requirements of a device are profiled. The current profile of the device can be obtained offline by using a current probe that monitors the current input to the device during the power up. This profile will be used as the typical current profile characteristics of this device family. The current threshold level can be established above the steady state current level by certain percentage such as 10%. The threshold time TH can be determined from the graph. This threshold time TH will be stored in the controller memory. With this method, the same TH will be used for all other devices in the same family. The current profile of the device can also be obtained online by using a current feedback element or sensor (such as a power resistor), which is placed in series with the output of the power supply as shown at 160 in FIG. 1*b*. When a power resistor is used as the current sensor, the differential voltage drop across this power resistor is proportional to the current (V=RI, where R is the resistor value, I is the current through the resistor and V is the voltage across the resistor R). The differential voltage is fed to the power control port at 162 in FIG. 1*b* where the voltage is digitized, and the digitized current is calculated (I=V/R) by the processor of the controller 120 in FIG. 1*b*. Thus, the whole current profile can be measured online and stored in the memory of the controller 120.

Returning to FIG. 3, an analysis is then undertaken at step 306 to determine an appropriate time threshold of when the device's current consumption has changed from a current rush-in mode to a steady state mode. This threshold can be seen to occur at a time indicated at 212 and labeled TH in FIG. 2. Various techniques can be used to determine the threshold time TH. In one embodiment, the peak current surge level is determined as well as the current level when the current being drawn is substantially constant—i.e. the substantially steady state current level. In the example shown in FIG. 2, the peak current is 2.15 amps and the substantially steady state current being drawn is approximately 0.6 amps. The threshold level is set somewhat arbitrarily to be 150% of the steady state level, which in this case is 0.9 amps. Then, by using the current vs. time graph stored in memory, it is possible to determine at what time the current being drawn by the device decreased to a level below the threshold level of 0.9 amps. In other words, at what time the device changes from operating in a high current region to operating in a low current region. In this example, the threshold time of when this occurred is shown at reference numeral 212, and defined to be variable TH for this device. Of course, other techniques for determining a suitable threshold level value and associated threshold time are possible, such as averaging the peak current draw and the steady state current draw to thereby set the threshold level to be in some proportion (e.g., half-way between the two). Returning back to step 306 of FIG. 3, the duration of time that the device operated in a high current mode is this determined TH value. Again, each device will typically vary somewhat in their respective current profiles, so each device will likely have a different TH value. So, as part of the profile operation, the TH value is determined for each device being profiled. The first phase of operation of the present invention has now been completed, as each of the devices has been profiled to determine the devices current draw characteristics.

The next phase of the present invention uses this determined device current profile information to provide a device start-up or spin-up optimization technique that reduces overall power consumption that would otherwise occur if all devices where started-up or spun-up concurrently. Moving now to step 308 of FIG. 3, N is set to the number of devices in the particular storage array (or number of sets of devices if the devices are organized and managed as a plurality of sets, with each device in a set being operated the same—i.e. starting spin-up of all devices in a set at the same time). Also in step 308, the variable i (index) is initialized to one (1) and the variable t (time) is initialized to zero (0). At step 310, control signal CSi is applied to supply power to the ith device Di (see, for example, FIG. 1*a*). Alternatively in step 310, if the devices are organized and managed as a plurality of sets of devices, control signal CSi is used to apply power to each device in the set Di[ ]. A timer (either part of RAID controller 120 or power control port 122 of FIG. 1*a*) maintains a value t which is the duration of time for which the present drive i, or set of drives i, has had its control signal CSi active to thereby supply power (or enable spin-up) of the given device/set i. Next, at step 312, a determination is made as to whether this value t is greater than or equal to threshold time THi for this device. If no, processing continues looping at step 312 to continue to monitor the value of t, and the control signal CS1 remains active to thus continue to power/enable the given device/set i. If yes is the result of the test at step 312, processing moves to step 314 where variable i is incremented in order to process the next device or set of devices. A determination is then made at step 316 on whether i is greater than N (the total number of devices). If no, processing continues at step 309 where the timer is reset to zero, and the next device or set of devices is powered on/enabled at step 310, while the timer is running and the value of t is updated. If yes is the result of the test at step 316, then all devices or sets of devices has been processed, and the sequencing of the power or spin-up enable of the devices has been completed.

Figure 4:
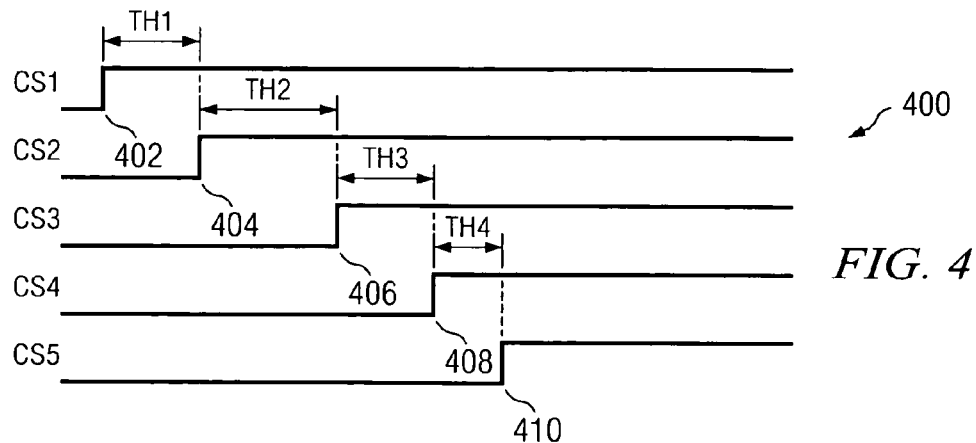
FIG. 4 is a timing diagram showing the control select line for each media drive going from an inactive state to an active state.

FIG. 4 shows at 400 a timing diagram of the control signals CS1-CS5 that are used to control the relays (or the electronic power switches) 130-138 in FIG. 1*a* that selectively power or spin-up media drives D1-D5. When it is time to power-up or spin-up the media array, D1 is first powered or enabled by control line CS1 at the time shown at 402. When the time threshold TH for drive D1 (TH1) is reached, the next media drive, in this instance drive D2, is powered or enabled by control line CS2 at the time shown at 404. When the time threshold TH for drive D2 (TH2) is reached, the next media drive, in this instance drive D3, is powered or enabled by control line CS3 at the time shown at 406. When the time threshold TH for drive D3 (TH3) is reached, the next media drive, in this instance drive D4, is powered or enabled by control line CS4 at the time shown at 408. When the time threshold TH for drive D4 (TH4) is reached, the next media drive, in this instance drive D5, is powered or enabled by control line CS5 at the time shown at 410. In this way, the power-up or enablement of the media drives is sequenced such that only a single drive at a time is experiencing its start-up or rush-in current draw, which is the high current region shown at 210 in FIG. 2.

Figure 5:
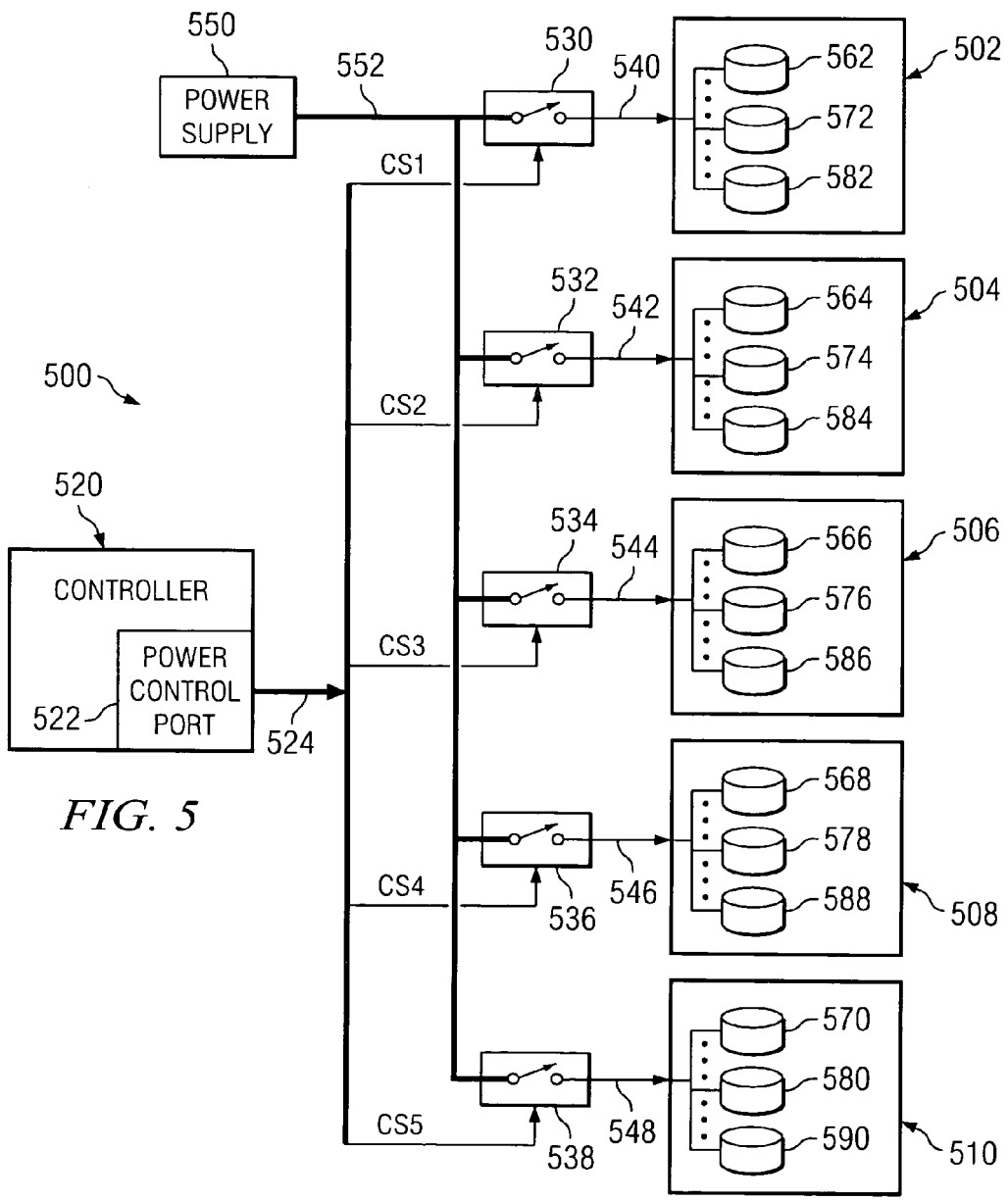
FIG. 5 is a system level block diagram of the enablement sequencing for a plurality of media drives in a data storage system where the drives are configured in sets or banks of drives.

In an alternate embodiment, each of the drives D1-D5 shown in FIG. 1*a* represent a set of drives, and control signals CS1-CS5 are used to enable respective individual sets of drives instead of individual drives. This configuration is shown at 500 in FIG. 5. A plurality of sets or banks of media drives is shown at 502, 504, 506, 508 and 510. Each set such as set 502 comprises a plurality media drives such as 562, 572 and 582. Similarly set 504 comprises drives 564, 574 and 584; set 506 comprises drives 566, 576 and 586; set 508 comprises drives 568, 578 and 588; and set 510 comprises drives 570, 580 and 590. As shown inside sets 502-510, the sets are not limited to three drives, but may contain more drives. The key feature of the set is that each drive of the set is controlled by a control line such as CS1 to concurrently power or enable all drives in the set. A controller 520 is provided, and includes power control port 522. In the preferred embodiment, power control port 522 controls signals on power control bus 524, including power control signals CS1, CS2, CS3, CS4 and CS5. Power control signals CS1-CS5 are operatively coupled to a control input control of power relays 530, 532, 534, 536 and 538, respectively. These power control signals are used to selectively enable power relays 530, 532, 534, 536 and 538 in order to selectively provide power from power supply 550, via power bus 552, to each of the sets of disk drives 502-510 which are each coupled to a respectively relay at 540, 542, 544, 546 and 548. Power control unit 522 is used to sequence or selectively enable the powering or spin-up of the sets of disk drives by use of power control signals which enable/disable power to the drives using the relays, in the same fashion as previously described with respect to powering up or enabling individual drives. Alternatively, control signals CS1-CS5 could be used to enable spinning of drives that are already powered up, as previously described. In such an alternate embodiment, power relays 130-138 would not be needed, and the drives would be directly coupled to a power source. Control signals CS1-CS5 would then be coupled to an appropriate input control signal of drive sets 502-510 to selectively control spin-up and spin-down of the drives.

Similarly, as part of online profiling each of the drive sets, the control signals are used to selectively enable all drives in a given set to determine the current requirements for the conglomeration of drives in the given set to thereby ascertain a current profile for the set of devices. This is accomplished in a similar fashion to determining a current profile for an individual drive—i.e. enabling all the drives in a given set and measuring the total current being drawn by all drives in the set using a current probe or current sensor, as previously described for profiling an individual drive.

Figure 6:
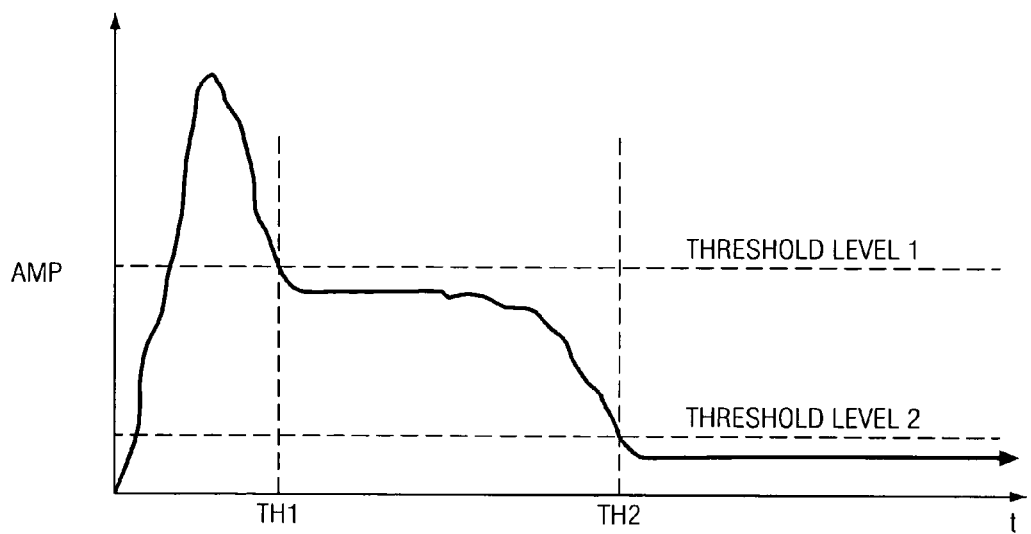
FIG. 6 is a representative current profile for a device having three operational current regions.

The techniques of the present invention are also applicable to devices having more than two current regions. An example of a device having three current regions is shown in FIG. 6. As can be seen, a determination of when Threshold level 1 occurs establishes the first time threshold TH1. Similarly, a determination of when Threshold level 2 occurs establishes the second time threshold TH2. The interplay for when to selectively enable a device or set of devices having more than two current regions will now be shown.

Figure 7:
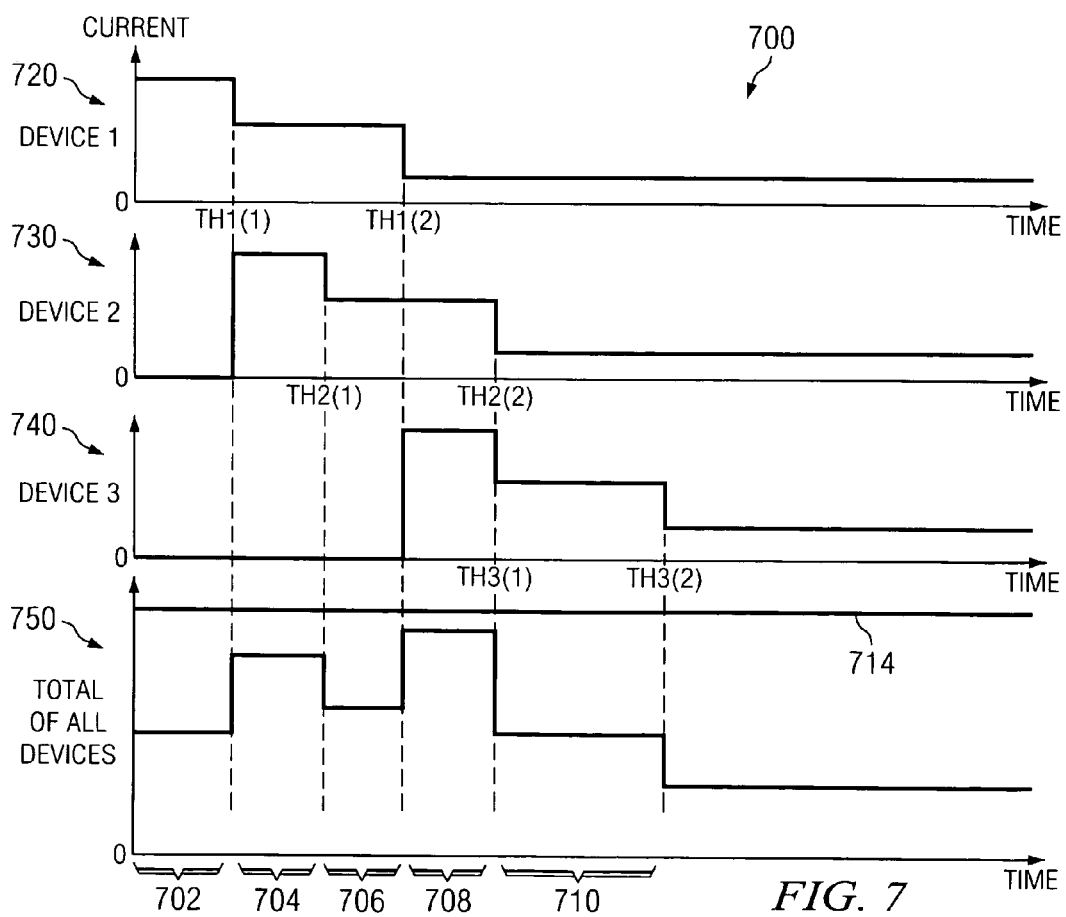
FIG. 7 depicts logical representations of current profiles for various devices having three operational current regions, where the power-up/enablement of the devices has been sequenced in accordance with the present invention. Also shown is the resultant total current being drawn by a power supply using the device sequencing of the present invention.

FIG. 7 shows at 700 the relative starting times and overall power usage or consumption using the principles of the present invention. Turning now to the specifics of FIG. 7, there are shown device profiles for individual device 1 at 720, device 2 at 730 and device 3 at 740. These could also be device profiles for three sets of devices. As can be seen, there is a high current-draw region, a medium current-draw region, and a low current draw region for each device. For example, device 1 has a high current region during the time period shown at 702. Device 2 has a high current region during the time period shown at 704. Device 3 has a high current region during the time period shown at 708. Here, the importance of keeping the overall power consumption below a system defined power ceiling is demonstrated. The power-up or enablement of these devices must be staggered such that the maximum current being drawn does not exceed the power ceiling shown at 714 on graph 750, which is a conglomeration of the total current being drawn by all devices. In this example, device 1 and device 2 cannot start simultaneously because the first stage of power usage is too high for enabling the two devices at the same time. However, once device 1 goes from high current usage to medium usage (shown at the junction of regions 702 and 704 at time TH1(1)), device 2 can start. Device 3, however, must wait until device 1 has gone to a low power usage (shown at the junction of regions 706 and 708 at time TH2(1)) before it can start. If there were a fourth device having a similar current profile to those shown by devices 1, 2 and 3, that device would be able to turn-on in time region 710, as both device 1 and device 2 are operating in their low current mode. Thus, the maximum current being drawn is during the time period 708, when device 1 is operating in its low current region, device 2 is operating in its medium current region, and device 3 is operating in its high current region. However, the total current being drawn by the total of these three devices is less than the ceiling shown at 714.

Figure 8:
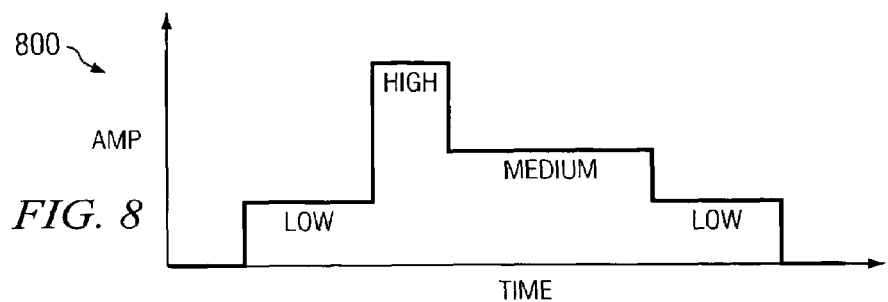
FIG. 8 shows a device current profile having four current regions, and where the peak current spike is towards the middle of the profile.
Figure 9:
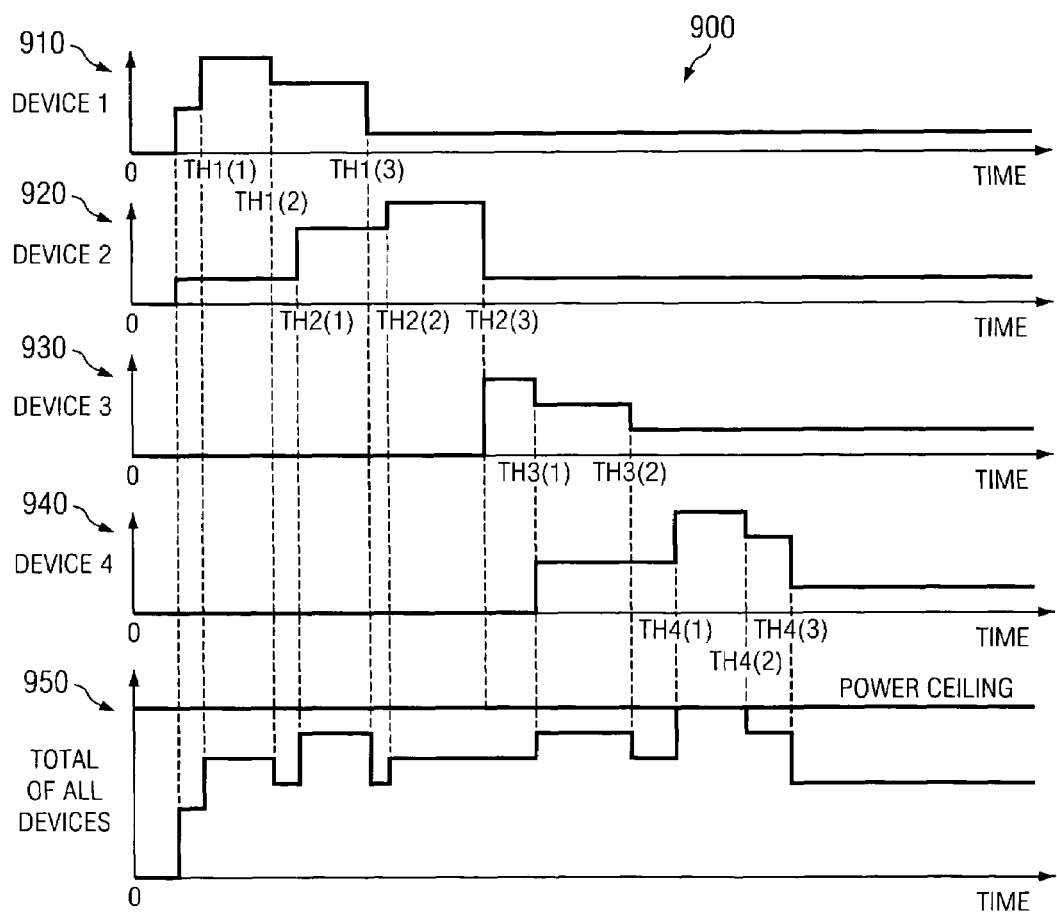
FIG. 9 depicts additional current profiles for various devices, including devices having current profiles similar to that shown in FIG. 8. Also shown is the resultant total current being drawn by a power supply using the device sequencing of the present invention.

It is also possible, using the principles of the present invention, to accommodate devices that have a current profile without an initial, or start-up spike, as shown at 800 in FIG. 8. This FIG. 8 also shows a device having four current draw operating modes. The same techniques as previously described with respect to FIG. 7 are used to determine the appropriate threshold levels and threshold times for sequencing the power-up/enablement of such devices. This can be seen at 900 in FIG. 9, where the current profiles for four devices are shown at 910, 920, 930 and 940. The device 1 profile shown at 910 can be seen to have its peak current spike delayed until time TH1(1). The device 2 profile shown at 920 has its peak current spike delayed until time TH2(2). The device 3 shown at 930 has the traditional initial peak current spike at the beginning of power-up or enablement. Device 3 is also shown as having three current levels in its profile, in contrast to the other devices shown in FIG. 9 which have four current levels. The device 4 profile shown at 940 has its peak current spike delayed until time TH4(1). The resulting overall current being drawn by the total of these four devices is shown at 950. Devices 1 and 2 were able to be powered-up or enabled at the same time since the total current drawn by these two devices never exceeds the peak power ceiling. Device 3 has its power-up/enablement delayed until both devices 1 and 2 have entered their quiescent low power mode, at time TH2(3). Device 4 is able to be powered-up or enabled once device 3 enters its medium current draw mode of operation, at time TH3(1), as the total current being drawn by all four devices does not exceed the peak power ceiling from then on.

Thus, an improved power or spin-enable technique has been described for managing power sequencing in a data storage system. The turn-on or spin-up sequence for a plurality of devices such as media drives in an array of media drives is selectively controlled such that the overall rush current is reduced. These techniques can also be applied to other types of devices exhibiting differing current draw operating regions at various times during their operation.

It is important to note that while the present invention has been described in the context of a fully functioning data storage system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. For example, the techniques described herein could be useful with any type of power control system that powers things from a non-moving to a moving state, or from a slow-moving state to a fast-moving state. In other words, the herein described techniques would be useful whenever an initial rush-in current is required to overcome inherent inertia of a device being powered. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing power, comprising the steps of:
   measuring current used to power the devices;
   based on the measured current, profiling a plurality of devices to determine a current profile for each individual device of the plurality of devices;
   based on the current profile of each individual device, determining at least one of a plurality of possible time thresholds of when each individual device goes from a high current region to at least one of a plurality of possible low current regions; and
   wherein the current profile of at least one of the individual drives comprises at least three successive current regions which decrease over time with at least two of the three current regions being associated with drive spin-up.

2. The method of claim 1, further comprising the steps of:
   enabling a first device of the plurality of devices for a period of time equal to the time threshold for the first device; and
   after the period of time has passed, enabling a second device of the plurality of devices for a second period of time equal to the time threshold for the second device.

3. The method of claim 2, further comprising the step of:
   after the second period of time has passed, continuing to successively enable another drive of the plurality of drives for a successive period of time equal to the time threshold of the another drive until all drives of the plurality of drives have been enabled.

4. The method of claim 3, wherein the plurality of devices are media drives.

5. The method of claim 4, wherein the step of enabling a media drive comprises applying power to the media drive.

6. The method of claim 5, wherein power is applied to the media drive by enabling a relay coupled to the media drive.

7. The method of claim 6, wherein the relay is controlled by a media drive controller.

8. The method of claim 7, wherein the media drive controller is a RAID controller.

9. The method of claim 4, wherein the step of enabling a media drive comprises enabling spin-up of the media drive.

10. A system for sequencing enablement of each of a plurality of devices, comprising:
    a controller;
    a power supply;
    a current sensor associated with each of the drives and configured to measure current consumption during operation; and
    means for selectively enabling each of the devices based on current profiles determined for the devices with the current sensor, wherein each of the current profiles indicates current consumption of the devices during operation and includes at least a first, second, and third current region, the first current region being associated with current consumption during initial spin-up, the third current region being associated with current consumption during steady-state operation, and the second current region being associated with current consumption after initial spin-up and before steady-state operation; and
    wherein the means for selectively enabling each of the devices:
    enables a first number of devices such that a first current consumption determined from the sum of the first current portion of the first number of devices is less than a maximum current threshold;
    after at least one or more of the first number of devices transitions to the second current region, sums the second current portion of each device that transitioned to the second current region and the remaining devices still operating in the first current region to determine a second current consumption for the first number of devices; and
    enables at least one more device if the sum of the second current consumption plus the first current profile of the at least one more device is less than a maximum current threshold.

11. The system of claim 10, wherein the plurality of devices are organized into a plurality of sets of devices, and the means for selectively enabling each of the devices concurrently enables each device of a given set.

12. The system of claim 11, wherein devices in a first set of the plurality of sets utilize a different media technology than devices in a second set of the plurality of sets.

13. The system of claim 10, wherein at least some of the plurality of devices are media drives.

14. The system of claim 10, wherein selectively enabling each of the devices comprises selectively applying power to each of the devices.

15. A method for managing power for a plurality of devices organized into a plurality of sets of devices, comprising the steps of:
    profiling each set to determine a current profile for each set as a function of measured current supplied to the each set, the current profile including a plurality of current regions;
    based on the current profile of each set, determining at least one time threshold of when each set goes from one current region to another current region;
    at a first period of time:
    (1) enabling a first set of the plurality of sets of devices;
    (2) enabling a second set of the plurality of sets of devices at a period of time equal to the determined time threshold for the first set; and
    (3) enabling a third set of the plurality of sets at a second period of time equal to the determined time threshold for the second set; and
    (4) successively enabling another set of the plurality of sets at a period of time equal to the determined time threshold of the most recently enabled set until all sets of the plurality of sets have been enabled; and
    after the first period of time:
    (5) based on the current profile of each set determined after the first period of time, re-determining the at least one time threshold of when each set goes from one current region to another current region; and
    (6) repeating steps (1)-(4) according to the re-determined time thresholds.

16. A method for sequencing enablement of a number of disk drives, the method comprising:
    measuring current consumption for each disk drive over a period of time associated with spinning up the disk drives to steady-state operation;
    determining current profiles for each disk drive based on the measured current consumption, the current profiles including indicating current consumption of the devices over the period of time associated with spinning up the disk drives to steady-state operation and includes at least a first, second, and third current region, the first current region being associated with current consumption during initial spin-up, the third current region associated with current consumption during steady-state operation, and the second current region associated with current consumption after initial spin-up and before steady-state operation such that the second current region corresponds with less current consumption that the first current region and more current consumption than the third current region;

enabling a first number of disk drives such that a first current consumption determined from the sum of the first current portion of the first number of disk drives is less than a maximum current threshold;

after at least one of the enabled disk drives transitions to the second current region, summing the second current portion of each device that transitioned to the second current region and any remaining devices still operating in the first current region to determine a second current consumption for the first number of disk drives; and enabling at least one more disk drive if the sum of the second current consumption plus the first current region of the at least one more disk drives is less than the maximum current threshold.

17. The method of claim 16 further comprising:

after at least of the enabled disk drives transitions to the third current region, summing the third current region of each device that transitioned to the second current region and any remaining devices still operating in the first or second current region to determine a third current consumption for the first number of disk drives; and enabling yet at least one more disk drive if the sum of the third current consumption plus the first current region of the yet at least one more disk drive is less than the maximum current threshold.

18. The method of claim 17 further comprising:

delaying enabling the yet at least one more disk drive if the sum of the third current consumption plus the first current region of the yet at least one more disk drive is greater than the maximum current threshold until at least one of the enabled disk drives transitions to another one of the current regions.

* * * * *